United States Patent
Mason et al.

(10) Patent No.: US 12,500,224 B2
(45) Date of Patent: Dec. 16, 2025

(54) ELECTROACTIVE COMPOSITE PARTICLES

(71) Applicant: NEXEON LIMITED, Abingdon (GB)

(72) Inventors: Charles Mason, Oxfordshire (GB); Christopher Friend, Oxfordshire (GB); Judit Serra Moreno, Abingdon (GB)

(73) Assignee: NEXEON LIMITED, London (GB)

( * ) Notice: Subject to any disclaimer, the term of this patent is extended or adjusted under 35 U.S.C. 154(b) by 0 days.

(21) Appl. No.: 18/871,753

(22) PCT Filed: Oct. 31, 2023

(86) PCT No.: PCT/GB2023/052847
§ 371 (c)(1),
(2) Date: Dec. 4, 2024

(87) PCT Pub. No.: WO2024/094994
PCT Pub. Date: May 10, 2024

(65) Prior Publication Data
US 2025/0174631 A1    May 29, 2025

(30) Foreign Application Priority Data
Oct. 31, 2022 (GB) .................................... 2216144

(51) Int. Cl.
*H01M 4/36* (2006.01)
*H01M 4/02* (2006.01)
(Continued)

(52) U.S. Cl.
CPC ........... *H01M 4/362* (2013.01); *H01M 4/386* (2013.01); *H01M 4/587* (2013.01); *H01M 2004/021* (2013.01)

(58) Field of Classification Search
None
See application file for complete search history.

(56) References Cited

U.S. PATENT DOCUMENTS 10,964,940 B1 * 3/2021 Mason ................ H01M 4/1393

FOREIGN PATENT DOCUMENTS

| | | |
|---|---|---|
| EP | 3994745 B1 | 9/2022 |
| KR | 20180113187 | 10/2018 |

(Continued)

OTHER PUBLICATIONS

"International Application No. PCT/GB2023/052847, International Preliminary Report on Patentability dated Jan. 30, 2024", (May 28, 2024), 13 pgs.

(Continued)

*Primary Examiner* — Zhongqing Wei
(74) *Attorney, Agent, or Firm* — Schwegman Lundberg & Woessner, P.A.

(57) ABSTRACT

This invention relates to a particulate material consisting of a plurality of composite particles comprising a porous particle framework and a plurality of nanoscale elemental silicon domains located within the pores of the porous particle framework. The porous particle framework comprises micropores and mesopores, wherein the total volume of micropores and mesopores in the porous particle framework as measured by gas adsorption is from 0.5 to 1.8 cm$^3$/g. The composite particles comprise from 30 to 70 wt % silicon, wherein at least 30 wt % of the silicon is surface silicon as determined by thermogravimetric analysis (TGA); no more than 1.2 wt % of hydrogen; and have a weight ratio of oxygen to silicon of no more than 0.15. The BET surface area of the composite particles is no more than 40 m$^2$/g.

34 Claims, 2 Drawing Sheets

(51) Int. Cl.
*H01M 4/38* (2006.01)
*H01M 4/587* (2010.01)

(56) References Cited

FOREIGN PATENT DOCUMENTS

| WO | WO-2013025707 A1 | 2/2013 |
|---|---|---|
| WO | 2017040299 | 3/2017 |
| WO | 2018165610 | 9/2018 |
| WO | WO-2020095067 A1 | 5/2020 |
| WO | WO-2020128495 A1 | 6/2020 |
| WO | WO-2022029422 A1 | 2/2022 |
| WO | WO-2022072715 A1 | 4/2022 |

OTHER PUBLICATIONS

"International Application No. PCT/GB2023/052847, International Search Report dated Jan. 30, 2024", (Jan. 30, 2024), 3 pgs.

"International Application No. PCT/GB2023/052847, Written Opinion dated Jan. 30, 2024", (Jan. 30, 2024), 5 pgs.

Bardet, Benjamin, et al., "In situ investigation of mesoporous silicon oxidation kinetics using infrared emittance spectroscopy", Physical Chemistry Chemical Physics 18.27, (2016), 18201-18208.

Webb, Paul A., et al., "Analytical methods in fine particle technology", vol. 55. Norcross: Micromeritics Instrument Corporation, (1997), 313 pgs.

"Korean Application No. 10-2024-7038358, Office Action dated Dec. 5, 2024", w English Translation, (Dec. 5, 2024), 18 pgs.

\* cited by examiner

ELECTROACTIVE COMPOSITE PARTICLES

PRIORITY APPLICATIONS

This application is a U.S. National Stage Filing under 35 U.S.C. § 371 from International Application No. PCT/GB2023/052847, filed on Oct. 31, 2023, and published as WO2024/094994 on May 10, 2024, which claims the benefit of priority to British Application No. 2216144.2, filed on Oct. 31, 2022; the benefit of priority of each of which is hereby claimed herein, and which applications and publication are hereby incorporated herein by reference in their entireties.

INTRODUCTION

This invention relates to composite particles that are suitable for use as anode active materials in lithium ion batteries. The composite particles comprise a porous particle framework and a plurality of silicon domains located within the pores of the porous particle framework. The dimensions and the chemical composition of the silicon domains are controlled for optimum electrochemical performance.

BACKGROUND TO THE INVENTION

Lithium-ion batteries (LIBs) comprise in general an anode, a cathode and a lithium-containing electrolyte. The anode generally comprises a metal current collector provided with a layer of an electroactive material, defined herein as a material which is capable of inserting and releasing lithium ions during the charging and discharging of a battery. When a LIB is charged, lithium ions are transported from the cathode via the electrolyte to the anode and are inserted into the electroactive material of the anode as intercalated lithium atoms. The terms "cathode" and "anode" are therefore used herein in the sense that the battery is placed across a load, such that the anode is the negative electrode. The term "battery" is used herein to refer both to devices containing a single lithium-ion cell and to devices containing multiple connected lithium-ion cells.

LIBs were developed in the 1980s and 1990s and have since found wide application in portable electronic devices. The development of electric or hybrid vehicles in recent has created a significant new market for LIBs and renewable energy sources have created further demand for on-grid energy storage which can be met at least in part by LIB farms. Overall, global production of LIBs is projected to grow from around 290 GWh in 2018 to over 2,000 GWh in 2028.

Alongside the growth in total storage capacity, there is significant interest in improving the gravimetric and/or volumetric capacities of rechargeable metal-ion batteries such that the same energy storage is achieved with less battery mass and/or less battery volume. Conventional LIBs use graphite as the anode electroactive material. Graphite anodes can accommodate a maximum of one lithium atom for every six carbon atoms resulting in a maximum theoretical specific capacity of 372 mAh/g in a lithium-ion battery, with a practical capacity that is somewhat lower (ca. 340 to 360 mAh/g).

Silicon is a promising alternative to graphite because of its very high capacity for lithium (see, for example, Insertion Electrode Materials for Rechargeable Lithium Batteries, Winter, M. et al. in Adv. Mater. 1998, 10, No. 10). Silicon has a theoretical maximum specific capacity of about 3,600 mAh/g in a lithium-ion battery (based on $Li_{15}Si_4$). However, such a high ratio of intercalated lithium to silicon results in expansion of the silicon material by up to 400% of its original volume. Repeated charging and discharging cycles result in significant mechanical stress on the silicon material leading to fracturing and structural failure. Furthermore, the charging of anodes in LIBs results in the formation of a solid electrolyte interphase (SEI) layer. This SEI layer is an ion-conductive yet insulating layer that is formed by the reductive decomposition of electrolytes on exposed electrode surfaces during the initial charge. In a graphite anode, this SEI layer is relatively stable during subsequent charge/discharge cycles. However, the expansion and contraction of a silicon anode results in fracturing and delamination of the SEI layer and the exposure of fresh silicon surface, resulting in further electrolyte decomposition, increased thickness of the SEI layer and irreversible consumption of lithium. These failure mechanisms collectively result in an unacceptable loss of electrochemical capacity over successive charging and discharging cycles.

The present inventors have previously reported the development of a class of electroactive materials having a composite structure in which electroactive materials, such as silicon, are deposited into the pore network of highly porous particles, e.g. a porous carbon material, having a carefully controlled pore size distribution. For example, WO 2020/095067 and WO 2020/128495 report that the improved electrochemical performance of these materials can be attributed to the way in which the electroactive materials form small domains with dimensions of the order of a few nanometres or less within the pore network of the porous particles, which thus function as a framework for the composite particles. The fine electroactive structures are thought to have a lower resistance to elastic deformation and higher fracture resistance than larger electroactive structures, and are therefore able to lithiate and delithiate without excessive structural stress. As a result, the electroactive materials exhibit good reversible capacity retention over multiple charge-discharge cycles. Secondly, by controlling the loading of silicon within the porous particle framework such that only part of the pore volume is occupied by silicon in the uncharged state, the unoccupied pore volume of the porous particle framework is able to accommodate a substantial amount of silicon expansion internally. Excessive expansion is constrained by the particle framework. Furthermore, only a small area of the electroactive material surface is accessible to electrolyte and so SEI formation is substantially prevented.

In WO 2022/029422, the applicant has reported a further development in which control of the distribution of electroactive silicon within the pore network of the particle framework results in still a further improvement in the electrochemical performance of the composite particles. Specifically, the applicant has shown that electrochemical performance is optimised when the length scale of the individual silicon structures in the composite particles is minimised such that a large proportion of the silicon atoms are in a surface region of the silicon structures, with a relatively smaller proportion of silicon atoms located inside bulky/coarse silicon structures. The applicant has identified an optimised pore structure of the porous particle framework and a set of conditions for the deposition of silicon into the porous particle framework that allows for an increased proportion of this so-called "surface silicon" while also ensuring a large amount of silicon in total is incorporated into the composite particles to meet overall volumetric energy density requirements. The nanoscale silicon domains formed by thermal decomposition of a silicon-containing precursor are thought to be in the form of nanoclusters of silicon atoms that are substantially terminated by silicon-hydrogen bonds (Si—H).

There remains a need in the art for further improvements to electroactive composite particles of the type described above to provide improvements in electrochemical performance and longevity of the materials over multiple charge discharge cycles. It has now been found the surface functionality of the nanoscale silicon domains may be altered to obtain improved electrochemical properties.

SUMMARY OF THE INVENTION

In a first aspect, the invention provides a particulate material consisting of a plurality of composite particles, wherein the composite particles comprise:
 (a) a porous particle framework comprising micropores and mesopores, wherein the total volume of micropores and mesopores in the porous particle framework as measured by gas adsorption is from 0.5 to 1.8 cm$^3$/g; and
 (b) a plurality of nanoscale elemental silicon domains located within the pores of the porous particle framework, wherein:
 (i) the composite particles comprise from 30 to 70 wt % silicon;
 (ii) at least 30 wt % of the silicon is surface silicon as determined by thermogravimetric analysis (TGA);
 (iii) the hydrogen content of the composite particles is no more than 1.2 wt %;
 (iv) the weight ratio of oxygen to silicon in the composite particles is no more than 0.15; and
 (v) the BET surface area of the composite particles is no more than 40 m$^2$/g.

The invention therefore relates in general terms to composite particles comprising a plurality of nanoscale silicon domains into the pore network of porous particles comprising micropores and mesopores. As used herein, the term "nanoscale silicon domain" refers to a nanoscale body of elemental silicon having maximum dimensions that are determined by the location of the silicon within the micropores and mesopores of the porous particles.

The deposition of nanoscale silicon domains in mesoporous and microporous particles is kinetically controlled such that thermal deposition takes place preferentially at the internal pore surfaces of the porous particles. The applicant has previously demonstrated in WO 2022/029422 how it is possible to obtain composite particles comprising a large proportion of so-called "surface silicon", which refers herein to silicon that is located in the surface region of a silicon microstructure. Silicon in a surface region of a silicon microstructure can be quantified by TGA measurements and therefore provides a measurement of the fineness of the silicon microstructures.

The nanoscale silicon domains formed by thermal decomposition of a silicon-containing precursor are thought to be in the form of nanoclusters of silicon atoms that have a range of different bonding interactions at their surfaces, between silicon atoms, between silicon atoms and the porous particle framework, as well as silicon atoms that are terminated by silicon-hydrogen bonds (Si—H). The surfaces of these silicon nanoclusters are highly reactive as a result of these unbalanced bonding interactions of the silicon atoms at the surfaces of the silicon nanoclusters. In particular, silicon surfaces that are terminated by silicon-hydrogen bonds (Si—H) are highly reactive in Li-ion cells when lithium insertion takes places. Increased stability can therefore be achieved when the composite particles have a high proportion of "surface silicon" but wherein Si—H bonding is reduced and wherein Si—Si bonding is maximised. Accordingly, the present invention provides a particulate material as defined above wherein at least 30 wt % of the silicon is surface silicon and wherein the hydrogen content of the composite particles is less than 1.2 wt %. In this way, the silicon maintains a desirable length scale for effective electrochemical performance while the reducing surface reactivity of the silicon.

In preferred embodiments of the invention, the oxygen content of the composite particles is no more than 10 wt %. When the oxygen content of the composite particles is too high, too much silicon is sequestered as Si—O bonding. This is more inert than Si—H bonding but it increases the resistivity of the electroactive material and also undergoes irreversible lithium insertion, with the potential to reduce the efficiency of the electroactive material in Li-ion cells.

The particulate material therefore builds upon prior disclosures by the applicant that have identified the performance benefit that is achieved by composite particles comprising a high proportion of surface silicon by the identification of a further beneficial structural feature of the composite particles. This is found to contribute to improved stability of the electroactive material during charging and discharging and therefore to an improvement in the cycle life of lithium ion batteries comprising the particulate material as an anode active material.

In a second aspect, the invention provides a composition comprising the particulate material of the first aspect and at least one other component.

In a third aspect, the invention provides an electrode comprising the particulate material of the first aspect or the composition of the second aspect.

In a fourth aspect, the invention provides a rechargeable metal-ion battery comprising the electrode of the third aspect.

DETAILED DESCRIPTION OF THE INVENTION

The composite particles of the invention comprise a plurality nanoscale elemental silicon domains located within the pores of a porous particle framework. The length scale of the nanoscale silicon domains in the particulate material of the invention is quantified using TGA analysis. This method of analysis relies on the principle that a weight gain is observed when silicon is oxidized to silicon dioxide (SiO$_2$) in air and at elevated temperature. The mechanisms by which silicon oxidizes are dependent on temperature. Silicon atoms at the surface of a silicon nanostructure are oxidized at a lower temperature than silicon atoms in the bulk of a silicon nanostructure (reference: Bardet et al., *Phys. Chem. Chem. Phys.* (2016), 18, 18201). By plotting the weight gain against temperature, it is possible to differentiate and quantify the bulk and surface silicon in the sample.

Figure 1:
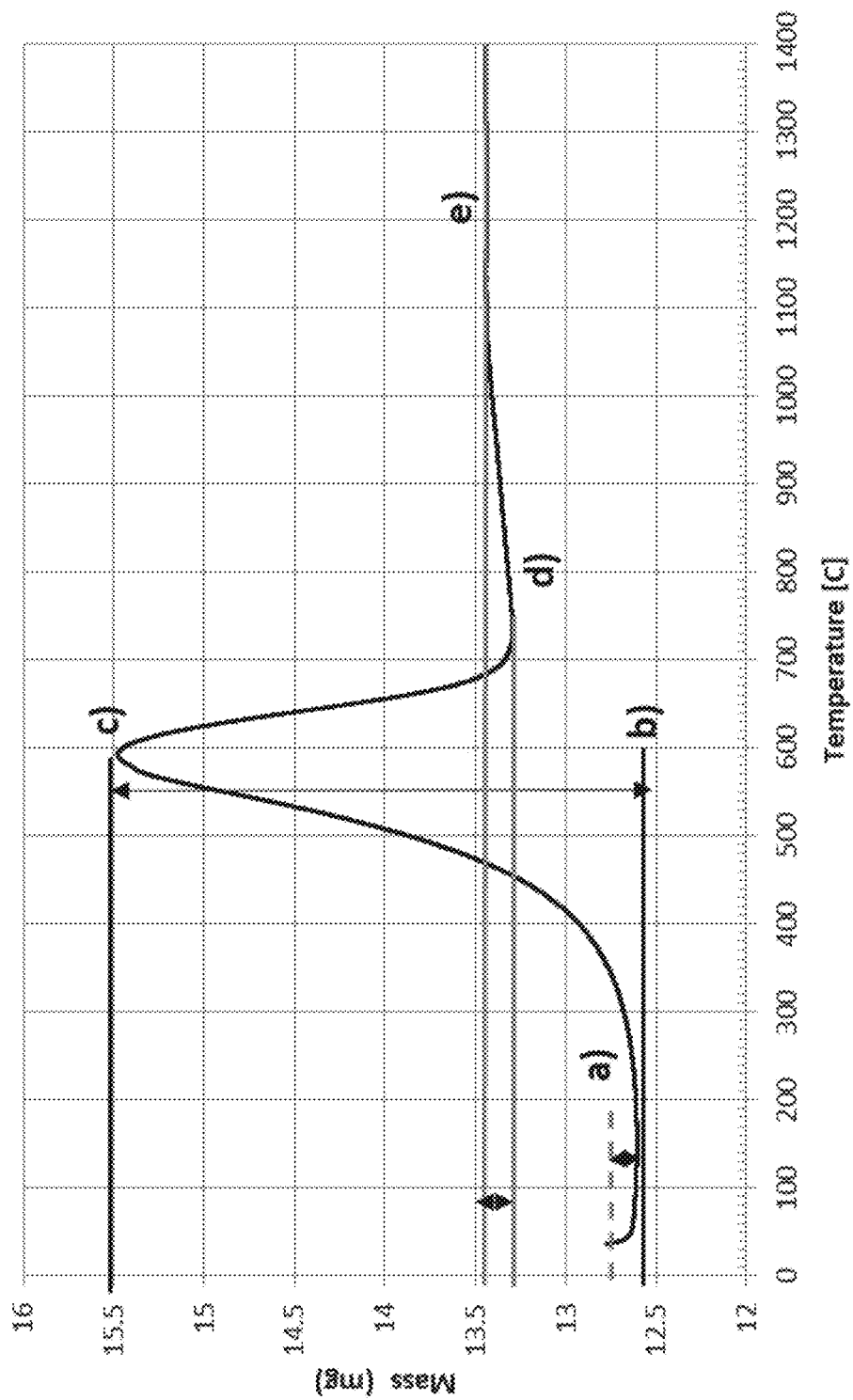
FIG. 1 shows the TGA trace for a particulate material according to the invention, comprising a high level of surface silicon and a low level of bulk coarse silicon.
Figure 2:
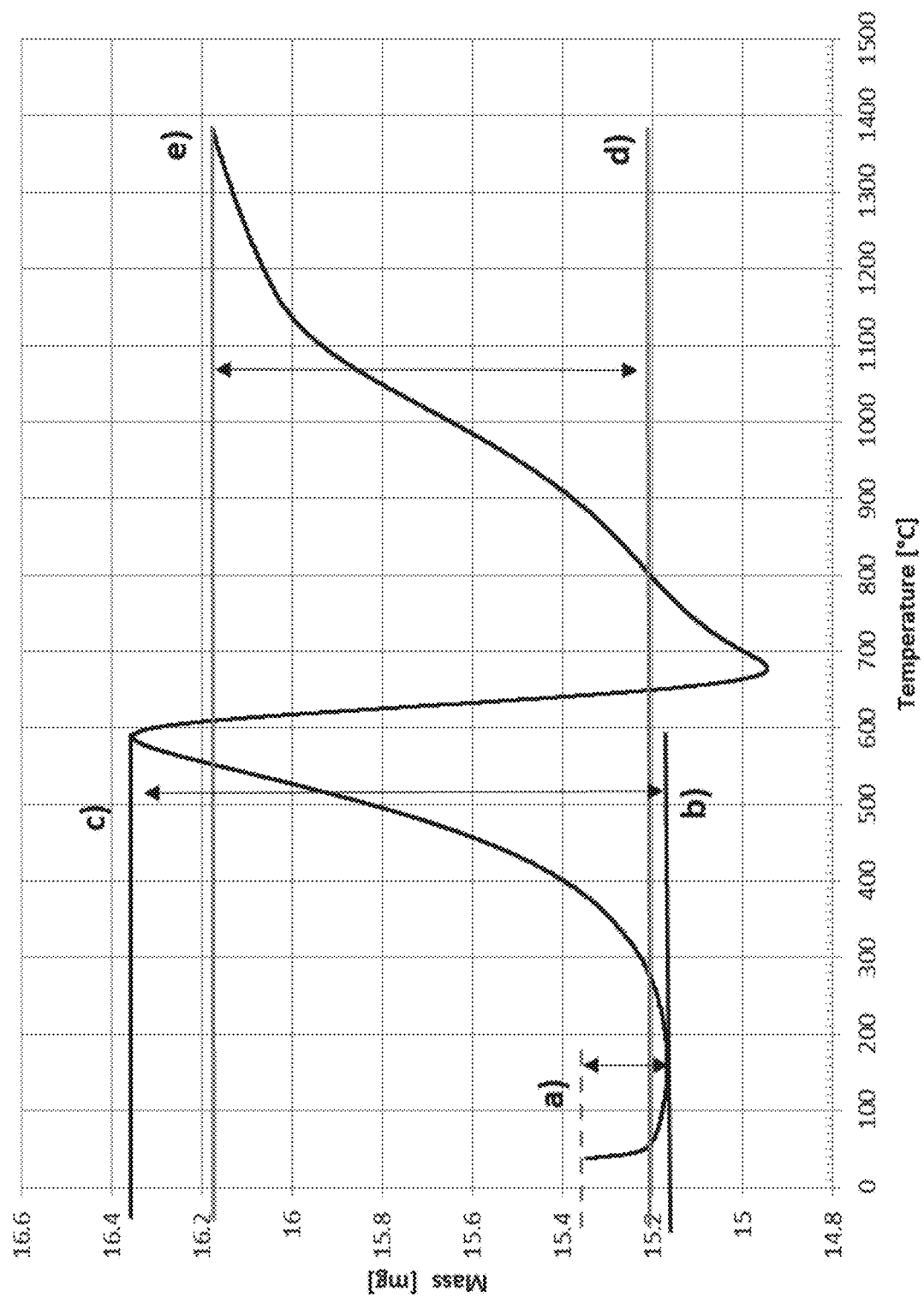
FIG. 2 shows the TGA trace for a particulate material comprising a low level of surface silicon and a high level of bulk coarse silicon.

The determination of the amount of unoxidized surface silicon is derived from the characteristic TGA trace for these materials, as shown in FIGS. 1 and 2. Following an initial mass loss up to ca. 300° C. (shown in FIGS. 1 and 2 as the mass reduction from (a) to (b)) a significant increase in mass is observed starting at ca. 400° C. and peaking between 550° C. and 650° C. (shown in FIGS. 1 and 2 as the mass increase from (b) to (c)). A reduction in mass is then observed as the porous particle framework is oxidized to CO2 gas (the mass reduction from (c)), then above ca. 800° C. a mass increase is again observed corresponding to the continued conversion of silicon to SiO2 which increases toward an asymptotic value above 1000° C. as silicon oxidation goes to completion (the mass increase from (d) to (e)). The temperature at which the weight increase occurs is related to the structure of the silicon, with surface silicon oxidized at low temperatures and bulk silicon oxidized at higher temperatures. Therefore, the more coarse the silicon domains, the more oxidation is observed at higher temperatures.

Any native oxide that is already formed on silicon surfaces that are exposed to air does not affect the TGA analysis, since silicon that is already oxidized does not give rise to a mass increase in the TGA analysis. Therefore the more the silicon surfaces are able to react with air to form a native oxide, the less surface silicon is observed by TGA. For avoidance of doubt, the calculation of "surface silicon" therefore takes into account only silicon that is unoxidized at the start of the TGA analysis after the material has been passivated by air or another surface passivating agent as described herein (i.e. the particulate material is not kept under any special inert conditions prior to the TGA analysis).

As defined herein, "surface silicon" is calculated from the initial mass increase in the TGA trace from a minimum between 150° C. and 500° C. to the maximum mass measured in the temperature range between 550° C. and 650° C., wherein the TGA is carried out in air with a temperature ramp rate of 10° C./min. This mass increase is assumed to result from the oxidation of surface silicon and therefore allows the percentage of surface silicon as a proportion of the total amount of silicon to be determined according to the following formula:

$$Y = 1.875 \times [(Mmax - Mmin)/Mf] \times 100\%$$

Wherein Y is the percentage of surface silicon as a proportion of the total silicon in the sample, Mmax is the maximum mass of the sample measured in the temperature range between 550° C. to 650° C. (mass (c) in FIGS. 1 and 2), Mmin is the minimum mass of the sample above 150° C. and below 500° C. (mass (b) in FIGS. 1 and 2), and Mf is the mass of the sample at completion of oxidation at 1400° C. (mass (e) in FIGS. 1 and 2). For completeness, it will be understood that 1.875 is the molar mass ratio of SiO2 to O2 (i.e. the mass ratio of SiO2 formed to the mass increase due to the addition of oxygen). Typically, the TGA analysis is carried out using a sample size of 10 mg±2 mg.

It has been found that optimum reversible capacity retention over multiple charge/discharge cycles is obtained when the surface silicon as determined by the TGA method described above is at least 30 wt % of the total amount of silicon in the material. Preferably at least 32 wt %, or at least 35 wt %, or at least 38 wt %, at least 40 wt %, or at least 42 wt %, or at least 45 wt %, at least 48 wt %, or at least 50 wt % of the silicon is surface silicon as determined by thermogravimetric analysis (TGA).

In addition to the surface silicon content, the particulate material of the invention preferably has a low content of coarse bulk silicon as determined by TGA. Coarse bulk silicon is defined herein as silicon that undergoes oxidation above 800° C. as determined by TGA, wherein the TGA is carried out in air with a temperature ramp rate of 10° C./min. This is shown in FIGS. 1 and 2 as the mass increase from (d) to (e). The coarse bulk silicon content is therefore determined according to the following formula:

$$Z = 1.875 \times [(M_f - M_{800})/M_f] \times 100\%$$

Wherein Z is the percentage of unoxidized silicon at 800° C., $M_{800}$ is the mass of the sample at 800° C. (mass (d) in FIGS. 1 and 2), and $M_f$ is the mass of ash at completion of oxidation at 1400° C. (mass (e) in FIGS. 1 and 2). For the purposes of this analysis, it is assumed that any mass increase above 800° C. corresponds to the oxidation of silicon to $SiO_2$ and that the total mass at completion of oxidation is $SiO_2$.

Preferably, no more than 6 wt %, or no more than 5 wt %, or no more than 4 wt % of the silicon, or no more than 3.5 wt %, or no more than 3 wt %, or no more than 2.5 wt %, or no more than 2 wt % or no more than 1.5 wt % of the silicon is coarse bulk silicon as determined by TGA.

Preferably at least 35 wt % of the silicon is surface silicon and no more than 6 wt % of the silicon, more preferably no more than 5 wt % of the silicon is coarse bulk silicon, wherein both are determined by TGA as defined herein. More preferably at least 40 wt % of the silicon is surface silicon and no more than 5 wt % of the silicon, more preferably no more than 4 wt % of the silicon is coarse bulk silicon, wherein both are determined by TGA as defined herein. More preferably at least 45 wt % of the silicon is surface silicon and no more than 4 wt % of the silicon, more preferably no more than 3 wt % of the silicon is coarse bulk silicon, wherein both are determined by TGA as defined herein. More preferably at least 50 wt % of the silicon is surface silicon and no more than 3 wt % of the silicon, more preferably no more than 2 wt % of the silicon is coarse bulk silicon, wherein both are determined by TGA as defined herein.

The total volume of micropores and mesopores (i.e. the total pore volume of pores having a diameter in the range of 0 to 50 nm) in the porous particle framework is from 0.5 to 1.8 cm³/g. For the avoidance of doubt, references herein to the pore volume of the porous particle framework relate (in the absence of any indication to the contrary) to the pore volume of the porous particle framework taken in isolation, i.e. as measured in the absence of any electroactive material (or any other material) occupying the pores of the porous particle framework.

Preferably, the total volume of micropores and mesopores in the porous particle framework is from at least 0.55 cm³/g, or at least 0.6 cm³/g, or at least 0.65 cm³/g, or at least 0.7 cm³/g, or at least 0.75 cm³/g.

A high pore volume may be advantageous since it allows a larger amount of silicon to be accommodated within the pore structure without compromising the resistance of the porous particle framework to fracturing under compressive stress during electrode manufacture or expansion stress due to lithiation of the silicon. However, if the pore volume is too high, then it is not possible to achieve the elevated levels of surface silicon that characterize this invention. Accordingly, the total volume of micropores and mesopores in the porous particle framework is preferably no more than 1.6 cm$^3$/g, or no more than 1.4 cm$^3$/g, or no more than 1.3 cm$^3$/g, or no more than 1.2 cm$^3$/g, or no more than 1.1 cm$^3$/g.

For example, the total volume of micropores and mesopores in the porous particle framework is preferably in the range from 0.55 to 1.6 cm$^3$/g, or from 0.6 to 1.4 cm$^3$/g, or from 0.65 to 1.3 cm$^3$/g, or from 0.7 to 1.2 cm$^3$/g, or from 0.75 to 1.1 cm$^3$/g.

The general term "PD$_n$ pore diameter" refers herein to the volume-based nth percentile pore diameter of the porous particle framework, based on the total volume of micropores and mesopores. For instance, the term "PD$_{50}$ pore diameter" as used herein refers to the pore diameter below which 50% of the total micropore and mesopore volume is found. For the avoidance of doubt, any macropore volume (pore diameter greater than 50 nm) is not taken into account for the purpose of determining PD$_n$ values.

The PD$_{90}$ pore diameter of the porous particle framework is preferably no more than 12 nm, or no more than 10 nm, or no more than 8 nm, or no more than 6 nm, or no more than 4 nm. Preferably, the PD$_{90}$ pore diameter is at least 3 nm. If the PD$_{90}$ value is too high, then excessive deposits of coarse silicon and/or excessive native oxide formation result in a low content of surface silicon. However, if the PD$_{90}$ is too low then infiltration of the pore volume by a silicon precursor is impeded and silicon instead deposits on the external surfaces of the porous particle framework.

The PD$_{50}$ pore diameter of the porous particle framework is preferably no more than 2 nm, or no more than 1.9 nm, or no more than 1.8 nm, or no more than 1.7 nm, or no more than 1.6 nm. Preferably, the PD$_{50}$ pore diameter of the porous particle framework is at least 1 nm, or at least 1.1 nm, or at least 1.2 nm. For example, the PD$_{50}$ pore diameter of the porous particle framework is preferably in the range from 1 to 2 nm, or from 1 to 1.9 nm, or from 1.1 to 1.8 nm, or from 1.1 to 1.7 nm, or from 1.2 to 1.6 nm.

As used herein, the micropore volume fraction refers to the volume of micropores expressed as a fraction of the total volume of micropores and mesopores. Put another way, the micropore volume fraction is the volume fraction of pores having diameter of 2 nm or less relative to the total volume of pores having a diameter of up to 50 nm.

Preferably, the micropore volume fraction of the porous particle framework is selected within the range of 0.45 to 0.95, in order to obtain the required high level of surface silicon content in the composite particles.

Preferably, the micropore volume fraction is at least 0.45, or at least 0.5, or at least 0.55, or at least 0.6, or at least 0.65, or at least 0.7, optionally at least 0.75. Preferably, the micropore volume fraction is no more than 0.9, or no more than 0.85, optionally no more than 0.8.

The micropore volume fraction may optionally be in the range from 0.5 to 0.9, or from 0.5 to 0.85, or from 0.55 to 0.80, or from 0.55 to 0.75, or from 0.6 to 0.7.

The total volume of micropores in the porous particle framework (determined using nitrogen gas adsorption at 77 K as described herein) is preferably at least 0.32 cm$^3$/g, or at least 0.36 cm$^3$/g, or at least 0.38 cm$^3$/g, at least 0.40 cm$^3$/g, at least 0.42 cm$^3$/g, or at least 0.5 cm$^3$/g, or at least 0.6 cm$^3$/g. As silicon located in micropores has a smaller length scale, a higher total micropore volume allows for a higher proportion of surface silicon to be accommodated within the porous particle framework, thus allowing for a higher gravimetric and volumetric capacity of the composite particles.

When the total volume of micropores and mesopores in the porous particle framework is in the range from 0.7 to 1.2 cm$^3$/g, the total volume of micropores is preferably in the range 0.4 to 0.9.

Any pore volume in the mesopore range is preferably substantially in the smaller range of mesopores. Accordingly, the fractional volume of pores having a pore size of 5 nm or less is preferably at least 0.8, or at least 0.82, or at least 0.84, or at least 0.86, or at least 0.88, or at least 0.9, based on the total volume of micropores and mesopores.

Preferably, the fractional volume of pores having a pore size of 10 nm or less is preferably at least 0.9, or at least 0.92, or at least 0.94, or at least 0.96, based on the total volume of micropores and mesopores. Preferably, the fractional volume of pores having a pore size of 20 nm or less is preferably at least 0.94, or at least 0.96, or at least 0.98, based on the total volume of micropores and mesopores.

A fraction of pores having diameters in the larger mesopore range may be advantageous to facilitate electrolyte access to the silicon domains. Therefore, pores having a diameter in the range of 10 to 50 nm (i.e. larger mesopores) may optionally constitute no more than 2%, or no more than 4%, or no more than 6% of the total micropore and mesopore volume of the porous particle framework.

The pore size distribution of the porous particle framework is preferably bimodal or multimodal. As used herein, the term "pore size distribution" relates to the distribution of pore size relative to the cumulative total internal pore volume of the porous particle framework. A bimodal or multimodal pore size distribution may be preferred since close proximity between micropores and pores of larger diameter provides the advantage of efficient ionic transport through the porous network to the silicon. Accordingly, the particulate material has high ionic diffusivity and therefore improved rate performance.

The total volume of micropores and mesopores and the pore size distribution of micropores and mesopores are determined using nitrogen gas adsorption at 77 K down to a relative pressure p/p$_0$ of 10$^{-6}$ using quenched solid density functional theory (QSDFT) in accordance with standard methodology as set out in ISO 15901-2 and ISO 15901-3. Nitrogen gas adsorption is a technique that characterizes the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers that are available from Micromeritics Instrument Corporation, USA, and the Autosorb IQ porosity analyzers that are available from Quantachrome Instruments.

Nitrogen gas adsorption is effective for the measurement of pore volume and pore size distributions for pores having a diameter up to 50 nm but is less reliable for pores of much larger diameter. For the purposes of the present invention, nitrogen adsorption is therefore used to determine pore volumes and pore size distributions only for pores having a diameter up to and including 50 nm.

In the case that the porous particle framework comprises macropores, the volume of pores in the range of greater than 50 nm and up to 100 nm is measured by mercury porosimetry. As set out above, this parameter relates to the pore volume of the porous particle framework when measured in isolation, i.e. in the absence of silicon or any other material occupying the pores of the porous particle framework. Pore volume measured by mercury porosimetry above 100 nm is assumed for the purposes of the invention to be inter-particle porosity.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension y taken to be 480 mN/m and the contact angle (p taken to be 140° for mercury at room temperature. The density of mercury is taken to be 13.5462 $g/cm^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology", 1997, Micromeritics Instrument Corporation, ISBN 0-9656783-0.

The volume of macropores is preferably small as compared to the volume of micropores and mesopores. While a small fraction of macropores may be useful to facilitate electrolyte access into the pore network, the advantages of the invention are obtained substantially by accommodating silicon in micropores and smaller mesopores.

Thus, in accordance with the invention the total volume of macropores in the range of greater than 50 nm and up to 100 nm in the porous particle framework is preferably no more than $0.2 \times P^1$, or no more than $0.1 \times P^1$, or no more than $0.05 \times P^1$, or no more than $0.02 \times P^1$, or no more than $0.01 \times P^1$, or no more than $0.005 \times P^1$, wherein $P^1$ represents the total volume of micropores and mesopores in the porous particle framework as defined above.

It will be appreciated that intrusion techniques such as gas adsorption and mercury porosimetry are effective only to determine the pore volume of pores that are accessible to nitrogen or to mercury from the exterior of the porous particle framework. Porosity values ($P^1$ and $P^2$) as specified herein shall be understood as referring to the volume of open pores, i.e. pores that are accessible to a fluid from the exterior of the porous particle framework. Fully enclosed pores that cannot be identified by nitrogen adsorption or mercury porosimetry shall not be taken into account herein when specifying porosity values. Likewise, any pore volume located in pores that are so small as to be below the limit of detection by nitrogen adsorption is not taken into account for determining porosity values.

The porous particle framework preferably has a BET surface area from 1200 to 3000 $m^2/g$. Preferably the porous particle framework has a BET surface area of at least 1500 $m^2/g$, or at least 1700 $m^2/g$. Preferably the porous particle framework has a BET surface area of no more than 2500 $m^2/g$, or no more than 2000 $m^2/g$. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277.

The porous particle framework preferably has a particle density of at least 0.35 and preferably less than 3 $g/cm^3$, more preferably less than 2 $g/cm^3$, more preferably less than 1.5 $g/cm^3$, most preferably from 0.35 to 1.2 $g/cm^3$. As used herein, the term "particle density" refers to "apparent particle density" as measured by mercury porosimetry (i.e. the mass of a particle divided by the particle volume wherein the particle volume is taken to be the sum of the volume of solid material and any closed or blind pores (a "blind pore" is pore that is too small to be measured by mercury porosimetry). Preferably, the porous particles have particle density of at least 0.4 $g/cm^3$, or at least 0.45 $g/cm^3$, or at least 0.5 $g/cm^3$, or at least 0.55 $g/cm^3$, or at least 0.6 $g/cm^3$, or at least 0.65 $g/cm^3$, or at least 0.7 $g/cm^3$. Preferably, the porous particles have particle density of no more than 1.15 $g/cm^3$, or no more than 1.1 $g/cm^3$, or no more than 1.05 $g/cm^3$, or no more than 1 $g/cm^3$, or no more than 0.95 $g/cm^3$, or no more than 0.9 $g/cm^3$.

The porous particle framework preferably comprises a conductive material. The use of a conductive porous particle framework is advantageous as a conductive framework within the composite particles facilitates the flow of electrons between lithium atoms/ions inserted into the electroactive material and a current collector.

A preferred type of conductive porous particle framework comprises or consists of a conductive carbon material, referred to herein as a conductive porous carbon particle framework.

The conductive porous carbon particle framework preferably comprises at least 80 wt % carbon, more preferably at least 85 wt % carbon, more preferably at least 90 wt % carbon, more preferably at least 95 wt % carbon, and optionally at least 98 wt % or at least 99 wt % carbon. The carbon may be crystalline carbon or amorphous carbon, or a mixture of amorphous and crystalline carbon. The porous carbon particle framework may be either a hard carbon or soft carbon particle framework.

As used herein, the term "hard carbon" refers to a disordered carbon matrix in which carbon atoms are found predominantly in the $sp^2$ hybridised state (trigonal bonds) in nanoscale polyaromatic domains. The polyaromatic domains are cross-linked with a chemical bond, e.g. a C—O—C bond. Due to the chemical cross-linking between the polyaromatic domains, hard carbons cannot be converted to graphite at high temperatures. Hard carbons have graphite-like character as evidenced by the large G-band (~1600 $cm^{-1}$) in the Raman spectrum. However, the carbon is not fully graphitic as evidenced by the significant D-band (~1350 $cm^{-1}$) in the Raman spectrum.

As used herein, the term "soft carbon" also refers to a disordered carbon matrix in which carbon atoms are found predominantly in the $sp^2$ hybridised state (trigonal bonds) in polyaromatic domains having dimensions in the range from 5 to 200 nm. In contrast to hard carbons, the polyaromatic domains in soft carbons are associated by intermolecular forces but are not cross-linked with a chemical bond. This means that they will graphitise at high temperature. The porous carbon particles preferably comprise at least 50% $sp^2$ hybridised carbon as measured by XPS. For example, the porous carbon particles may suitably comprise from 50% to 98% $sp^2$ hybridised carbon, from 55% to 95% $sp^2$ hybridised carbon, from 60% to 90% $sp^2$ hybridised carbon, or from 70% to 85% $sp^2$ hybridised carbon.

A variety of different materials may be used to prepare suitable porous carbon particles via pyrolysis. Examples of organic materials that may be used include plant biomass including lignocellulosic materials (such as coconut shells, rice husks, wood etc.) and fossil carbon sources such as coal. Examples of resins and polymeric materials which form porous carbon particles on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different carbon materials are available in the art depending on the starting material and the conditions of the pyrolysis process. Porous carbon particles of various different specifications are available from commercial suppliers.

Porous carbon particles may undergo a chemical or gaseous activation process to increase the volume of mesopores and micropores. A suitable activation process comprises contacting pyrolyzed carbon with one or more of oxygen, steam, CO, $CO_2$ and KOH at a temperature in the range from 600 to 1000° C.

Mesopores can also be obtained by known templating processes, using extractable pore formers such as MgO and other colloidal or polymer templates which can be removed by thermal or chemical means post pyrolysis or activation.

Alternatives to carbon-based conductive particles include porous particles comprising titanium nitride (TiN), titanium carbide (TiC), silicon carbide (SiC), nickel oxide ($NiO_x$), titanium silicon nitride (TiSiN), nickel nitride ($Ni_3N$), molybdenum nitride (MoN), titanium oxynitride ($TiO_xN_{1-x}$), silicon oxycarbide (SiOC), boron nitride (BN), or vanadium nitride (VN). Preferably the porous particles comprise titanium nitride (TiN), silicon oxycarbide (SiOC) or boron nitride (BN).

The elemental composition of the composite particles can be determined by elemental analysis. Elemental analysis is used to determine the weight percentages of silicon, hydrogen and carbon in the composite particles. Optionally, the amounts of nitrogen and oxygen may also be determined by elemental analysis.

The silicon content is preferably determined by ICP-OES (Inductively coupled plasma-optical emission spectrometry). A number of ICP-OES instruments are commercially available, such as the iCAP® 7000 series of ICP-OES analyzers available from ThermoFisher Scientific. The carbon content of the composite particles and of the porous particle framework alone (as well as the hydrogen, nitrogen and oxygen content if required) are preferably determined by combustion and Infrared (IR) absorption techniques. A suitable instrument for determining carbon, hydrogen, nitrogen and oxygen content is the TruSpec® Micro elemental analyzer available from LECO Corporation.

The composite particles comprise from 30 to 70 wt % silicon. Preferably, the composite particles comprise at least 32 wt % silicon, or at least 35 wt % silicon, or at least 38 wt % silicon, or at least 40 wt % silicon, or at least 42 wt % silicon, or at least 44 wt % silicon, or at least 46 wt % silicon, or at least 48 wt % silicon, or at least 50 wt % silicon. Optionally, the composite particles may comprise up to 68 wt % silicon, or up to 65 wt % silicon, or up to 60 wt % silicon, or up to 58 wt % silicon, or up to 55 wt % silicon. For example, the composite particles may comprise from 32 to 68 wt % silicon, or from 35 to 66 wt % silicon, or from 38 to 64 wt % silicon, or from 40 to 62 wt % silicon, or from 42 to 60 wt % silicon, or from 44 to 58 wt % silicon.

A minimum amount of silicon is required to ensure that the particulate material has sufficient volumetric capacity for commercial use. However, an excessive amount of silicon results in silicon depositing in larger pores and/or on the surface of the porous particle framework resulting in a lower content of surface silicon and inferior performance as an electroactive material.

The amount of silicon in the composite particles of the invention is selected such that at least around 20% and up to around 78% of the internal pore volume of the porous particle framework (based on micropores and mesopores) is occupied by silicon (in the uncharged state). In general, the higher the microporous fraction of the porous particle framework, the higher the amount of silicon that may be used without reducing the percentage of surface silicon.

Preferably the silicon occupies from about 20% to about 78% of the internal pore volume of the porous particle framework, for example from about 23% to 75%, or about 26% to 72%, or from about 28% to 70%, or from about 30% to 70%, or from about 35% to 68%, or from about 40% to 65%, or from about 45 to 60% of the of the internal pore volume of the porous particle framework. Within these preferred ranges, the pore volume of the porous particle framework is effective to accommodate expansion of the silicon during charging and discharging, but avoids excess pore volume that does not contribute to the volumetric capacity of the particulate material. However, the amount of silicon is also not so high as to impede effective lithiation due to inadequate metal-ion diffusion rates or due to inadequate expansion volume resulting in mechanical resistance to lithiation.

The amount of silicon in the porous particle framework can be correlated to the available pore volume by the requirement that the weight ratio of silicon to the porous particle framework is in the range from $[0.50 \times P^1$ to $1.9 \times P^1]$: 1, wherein $P^1$ represents the total volume of micropores and mesopores in the porous particle framework as defined above. This relationship takes into account the density of silicon and the pore volume of the porous particle framework to define a weight ratio of silicon at which the pore volume is estimated to be around 20% to 78% occupied. Preferably, the weight ratio of silicon to the porous particle framework is in the range from $[0.7 \times P^1$ to $1.8 \times P^1]$:1, which indicates that the pore volume is around 30% to 78% occupied.

Preferably, the weight ratio of silicon to the porous particle framework is at least $0.50 \times P^1$, or at least $0.55 \times P^1$, or at least $0.6 \times P^1$, or at least $0.65 \times P^1$, or at least $0.7 \times P^1$, or at least $0.75 \times P^1$, or at least $0.8 \times P^1$, or at least $0.85 \times P^1$, or at least $0.9 \times P^1$, or at least $0.95 \times P^1$, or at least $1 \times P^1$. Preferably, the weight ratio of silicon to the porous particle framework is no more than $1.85 \times P^1$, or no more than $1.8 \times P^1$, or no more than $1.75 \times P^1$, or no more than $1.7 \times P^1$, or no more than $1.65 \times P^1$, or no more than $1.6 \times P^1$, or no more than $1.55 \times P^1$, or no more than $1.5 \times P^1$.

The composite particles of the invention comprise less than 1.2 wt % hydrogen. Preferably, the composite particles comprise at least 0.1 wt % hydrogen, or at least 0.15 wt % hydrogen, or at least 0.2 wt % hydrogen. Preferably, the composite particles comprise no more than 1.1 wt % hydrogen, or no more than 1 wt % hydrogen, or no more than 0.95 wt % hydrogen, or no more than 0.9 wt % hydrogen, or no more than 0.85 wt % hydrogen, or no more than 0.8 wt % hydrogen, or no more than 0.75 wt % hydrogen. For example the composite particles may comprise from 0.1 to 0.9 wt % hydrogen, more preferably from 0.15 to 0.85 wt % hydrogen, more preferably from 0.15 to 0.8 wt % hydrogen, more preferably from 0.2 to 0.8 wt % hydrogen.

Preferably, the ratio of hydrogen to silicon (H wt %/Si wt %×100%) is in the range from 1.0-3.0 w %, more preferably 1.4 to 2.8 wt %.

The composite particles preferably have a low total oxygen content, as determined by elemental analysis. Oxygen may be present in the composite particles for instance as part of the porous particle framework or as an oxide layer on any exposed silicon surfaces. Preferably, the composite particles comprise no more than 6 wt % oxygen, or no more than 5.5 wt % oxygen, or no more than 5 wt % oxygen, or no more than 4.5 wt % oxygen, for example no more than 4 wt % oxygen, or no more than 3 wt % oxygen, or no more than 2 wt % oxygen, or no more than 1 wt % oxygen, or no more than 0.5 wt % oxygen.

Preferably, the weight ratio of oxygen to silicon in the composite particles is no more than 0.14, or no more than 0.12, or no more than 0.1, or no more than 0.09, or no more than 0.08.

Preferably silicon and carbon together constitute at least 90 wt % of the composite particles, more preferably at least 95 wt % of the composite particles.

The silicon may optionally comprise a minor amount of one or more dopants. Suitable dopants include boron and phosphorus, other n-type or p-type dopants, nitrogen, or germanium. Preferably, the dopants are present in a total amount of no more than 2 wt % based on the total amount of silicon and the dopant(s).

Preferably, the total volume of micropores and mesopores in the composite particles (i.e. in the presence of the silicon), as measured by nitrogen gas adsorption, is no more than $0.15 \times P^1$, or up to $0.10 \times P^1$, or up to $0.05 \times P^1$, or up to $0.02 \times P^1$.

Preferably, the total volume of micropores and mesopores in the composite particles (i.e. in the presence of the silicon), as measured by nitrogen gas adsorption, is no more than 0.2 cm$^3$/g, or no more than 0.15 cm$^3$/g, or no more than 0.12 cm$^3$/g, or no more than 0.1 cm$^3$/g, or no more than 0.09 cm$^3$/g, or no more than 0.08 cm$^3$/g, or no more than 0.07 cm$^3$/g, or no more than 0.06 cm$^3$/g, or no more than 0.05 cm$^3$/g.

Preferably the total volume of micropores and mesopores in the composite particles, as measured by nitrogen gas adsorption, is less than 0.2 cm$^3$/g, preferably less than 0.15 cm$^3$/g, or less than 0.1 cm$^3$/g, or less than 0.08 cm$^3$/g, or less than 0.06 cm$^3$/g, or less than 0.04 cm$^3$/g, or less than 0.02 cm$^3$/g, or less than 0.015 cm$^3$/g, or less than 0.012 cm$^3$/g, or less than 0.010 cm$^3$/g, or less than 0.008 cm$^3$/g.

The term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

The terminology "$D_n$" used herein to define particle diameter distributions is to be distinguished from the terminology "$PD_n$" that is used herein, as described above, to define pore diameter distributions.

Particle diameters and particle size distributions can be determined by routine laser diffraction techniques in accordance with ISO 13320:2009. Unless stated otherwise, particle size distribution measurements as specified or reported herein are as measured by the conventional Malvern Mastersizer™ 3000 particle size analyzer from Malvern Instruments. The Malvern Mastersizer™ 3000 particle size analyzer operates by projecting a helium-neon gas laser beam through a transparent cell containing the particles of interest suspended in an aqueous solution. Light rays that strike the particles are scattered through angles that are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in 2-propanol with a 5 vol % addition of the surfactant SPAN™-40 (sorbitan monopalmitate). The particle refractive index is taken to be 2.68 for porous particle framework particles and 3.50 for composite particles and the dispersant index is taken to be 1.378. Particle size distributions are calculated using the Mie scattering model.

The composite particles may have a $D_{50}$ particle diameter in the range from 1 to 30 μm. Preferably, the $D_{50}$ particle diameter of the composite particles may be at least 1 μm, or at least 2 μm, or at least 3 μm, or at least 4 μm, or at least 5 μm. Optionally the $D_{50}$ particle diameter may be no more than 20 μm, or no more than 18 μm, or no more than 16 μm, or no more than 14 μm, or no more than 12 μm, or no more than 10 μm, or no more than 8 μm.

For instance, the composite particles may have a $D_{50}$ particle diameter in the range from 1 to 20 μm, or from 1 to 18 μm, or from 1 to 16 μm, or from 2 to 16 μm, or from 2 to 14 μm, or from 2 to 12 μm, or from 2 to 10 μm, or from 2 to 8 μm. Particles within these size ranges and having porosity and a pore diameter distribution as set out herein are ideally suited for use in anodes for metal-ion batteries, due to their dispersibility in slurries, their structural robustness, their capacity retention over repeated charge-discharge cycles, and their suitability for forming dense electrode layers of uniform thickness in the conventional range from 20 to 50 μm.

The $D_{10}$ particle diameter of the composite particles is preferably at least 0.5 μm, or at least 0.8 μm, or at least 1 μm, or at least 1.5 μm, or at least 2 μm. By maintaining the $D_{10}$ particle diameter at 0.5 μm or more, the potential for undesirable agglomeration of sub-micron sized particles is reduced, resulting in improved dispersibility of the particulate material and improved capacity retention.

The $D_1$ particle size of the composite particles is preferably at least 0.5 μm, or at least 0.8 μm, or at least 1.0 μm, or at least 1.2 μm, or at least 1.4 μm, or at least 1.5 μm.

The $D_{90}$ particle diameter of the composite particles is preferably no more than 50 μm, or no more than 40 μm, or no more than 30 μm, or no more than 25 μm, or no more than 20 μm, or no more than 15 μm. The presence of very large particles results in non-uniform forming packing of the particles in electrode active layers, thus disrupting the formation of dense electrode layers, particularly electrode layers having a thickness in the range from 20 to 50 μm. Therefore, it is preferred that the $D_{90}$ particle diameter is up to 40 μm, and more preferably lower still.

The composite particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

The composite particles preferably have a positive skew in the volume-based distribution, for example, such that the volume based distribution is asymmetric with a longer tail on the right hand side. A positive skew in the volume-based particle size distribution is advantageous since it provides a denser electrode since the natural packing factor will be higher than if all particles are the same size, thereby reducing the need for calendering or other physical densification processes. Preferably, the $D_{50}$ composite particle size diameter is less than the volume-based mean of the particle size diameter distribution (D[4.3]). Preferably, the skew of the composite particle size distribution (as measured by a Malvern Mastersizer™ 3000 analyzer) is no more than 5, or no more than 3.

The composite particles may have an average sphericity (as defined herein) of at least 0.5, or at least 0.55. Preferably the average sphericity is at least 0.65, or at least 0.7, or at least 0.75, or at least 0.8.

It is possible to obtain highly accurate two-dimensional projections of micron scale particles by scanning electron microscopy (SEM) or by dynamic image analysis, in which a digital camera is used to record the shadow projected by a particle. The term "sphericity" as used herein shall be understood as the ratio of the area of the particle projection (obtained from such imaging techniques) to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population. The average sphericity for a population of particles is preferably calculated from the two-dimensional projections of at least 50 particles.

The composite particles of the invention preferably have a BET surface area of no more than 35 m²/g, or no more than 30 m²/g, or no more than 25 m²/g, or no more than 20 m²/g, or no more than 15 m²/g, or no more than 10 m²/g.

In general, a low BET surface area is preferred in order to minimize the formation of solid electrolyte interphase (SEI) layers at the surface of the composite particles during the first charge-discharge cycle of an anode comprising the particulate material of the invention. However, a BET surface area that is excessively low results in unacceptably low charging rate and capacity limitations due to the inaccessibility of the bulk of the electroactive material to metal ions in the surrounding electrolyte. For instance, the BET surface area is preferably at least 0.1 m²/g, or at least 1 m²/g, or at least 2 m²/g, or at least 5 m²/g. For instance, the BET surface area may be in the range from 1 m²/g to m²/g, more preferably in the range from 2 to 15 m²/g.

The composite particles preferably have a tap density of more than 0.7 g/cm³, or at least 0.8 g/cm³, or at least 0.85 g/cm³, or at least 0.9 g/cm³, as measured in accordance with ISO 3953 and ISO 787 (Determination of tamped volume and apparent density after tamping), using a Quantachrome™ Autotap. Drop height of the instrument is 3 mm and tapping frequency of the instrument is fixed at 250-265 taps/min. The sample is tapped at least 5,000 times. If the sample volume is still observed to be changing after 5,000 taps then additional increments of 1,250 taps are applied until no further volume change is observed.

The particulate material of the invention typically has a specific charge capacity on first lithiation of 900 to 2300 mAh/g. Preferably, the particulate material of the invention has a specific charge capacity on first lithiation of at least 1200 mAh/g, or at least 1400 mAh/g.

The particulate material of the invention may optionally comprise a silicon surface that has been treated with a passivating agent. As discussed in further detail below, a passivating agent is defined herein as a compound that is capable of modifying the surface of the electroactive material in such a way as to inhibit or prevent the formation of surface oxides.

The composite particles of the invention may optionally be coated with a lithium-ion permeable coating. The coating may at least partially cover, and preferably fully covers, the external surfaces of the particles. As used herein, the term "lithium ion permeable" refers to an ionically conductive material that allows the transport of lithium ions from the exterior of the composite particles to the nanoscale electroactive material domains. Preferably, the lithium-ion permeable coating is impermeable to liquids, such as the solvents of liquid electrolytes. Preferably, the lithium-ion permeable filler material is electrochemically stable at <0.1 V vs. Li/Li$^+$.

Optionally the coating may be a conductive carbon coating. Suitably a conductive carbon coating may be obtained by a chemical vapour deposition (CVD) method. CVD is a well-known methodology in the art and comprises the thermal decomposition of a volatile carbon-containing gas (e.g. ethylene) onto the surface of the particulate material. Alternatively, the carbon coating may be formed by depositing a solution of a carbon-containing compound onto the surface of the particulate material followed by pyrolysis. The conductive carbon coating is sufficiently permeable to allow lithium access to the interior of the composite particles without excessive resistance, so as not to reduce the rate performance of the composite particles. For instance, the thickness of the carbon coating may suitably be in the range from 2 to 50 nm, for example from 2 to 30 nm. Optionally, the carbon coating may be porous and/or may only cover partially the surface of the composite particles.

Alternatively, the coating may comprise a lithium-ion permeable solid electrolyte. Examples of suitable lithium permeable solid electrolytes include: garnet-type solid electrolytes (including "LLZO" electrolytes such as $Li_7La_3Zr_2O_{12}$ and $Li_{6.5}La_3Ti_{0.5}Zr_{1.5}O_{12}$); perovskite-type solid electrolytes (including "LLTO" electrolytes such as $Li_{0.33}La_{0.57}TiO_3$); LISICON-type solid electrolytes, NaSICON-type solid electrolytes (such as $Li_{1.3}Al_{0.3}Ti_{1.7}(PO_4)_3$); lithium phosphorous oxy-nitride (LiPON) solid electrolytes; $Li_3N$-type solid electrolytes; lithium phosphate ($Li_3PO_4$) solid electrolytes, lithium titanate ($Li_4Ti_5O_2$) solid electrolytes; lithium tantalate (LiTaO$_3$) solid electrolytes; sulfide-type solid electrolytes; argyrodite-type solid electrolytes;

and anti-perovskite-type solid electrolytes. Variants (e.g. including dopants) and combinations of these electrolyte types are also included.

A coating has the advantages that it further reduces the BET surface area of the particulate material by smoothing any surface defects and by filling any remaining surface microporosity, thereby further reducing first cycle loss. The use of electronically conductive coatings, such as a carbon coating, is particularly advantageous as it improves the conductivity of the surface of the composite particles, improving the rate performance of the particulate material when used as electroactive materials in lithium-ion batteries, and/or reducing the need for conductive additives in electrode compositions, and also creates an improved surface for the formation of a stable SEI layer, resulting in improved capacity retention on cycling. In the case that the composite particles comprise a coating, the silicon content of the particles in wt % is determined based on the weight of the particles including the coating.

A preferred particulate material according to the invention is one in which the total volume of micropores and mesopores in the porous particle framework as measured by gas adsorption is from 0.6 to 1.4 $cm^3/g$; the micropore volume fraction based on the total volume of micropores and mesopores in the porous particle framework is from 0.5 to 0.9; the silicon content of the composite particles is from 40 to 70 wt %; at least 30 wt % of the silicon is surface silicon as determined by thermogravimetric analysis (TGA); no more than 5 wt % of the silicon is coarse bulk silicon as determined by thermogravimetric analysis (TGA); and the hydrogen content of the composite particles is from 0.4 to 0.9 wt %.

A more preferred particulate material according to the invention is one in which the total volume of micropores and mesopores in the porous particle framework as measured by gas adsorption is from 0.65 to 1.3 $cm^3/g$; the micropore volume fraction based on the total volume of micropores and mesopores in the porous particle framework is from 0.55 to 0.9; the silicon content of the composite particles is from 42 to 68 wt %; at least 35 wt % of the silicon is surface silicon as determined by thermogravimetric analysis (TGA); no more than 4 wt % of the silicon is coarse bulk silicon as determined by thermogravimetric analysis (TGA); and the hydrogen content of the composite particles is from 0.45 to 0.85 wt %.

A more preferred particulate material according to the invention is one in which the total volume of micropores and mesopores in the porous particle framework as measured by gas adsorption is from 0.7 to 1.2 $cm^3/g$; the micropore volume fraction based on the total volume of micropores and mesopores in the porous particle framework is from 0.6 to 0.85; the silicon content of the composite particles is from 44 to 66 wt %; at least 40 wt % of the silicon is surface silicon as determined by thermogravimetric analysis (TGA); no more than 3 wt % of the silicon is coarse bulk silicon as determined by thermogravimetric analysis (TGA); and the hydrogen content of the composite particles is from 0.5 to 0.8 wt %.

A more preferred particulate material according to the invention is one in which the total volume of micropores and mesopores in the porous particle framework as measured by gas adsorption is from 0.75 to 1.1 $cm^3/g$; the micropore volume fraction based on the total volume of micropores and mesopores in the porous particle framework is from 0.65 to 0.85; the silicon content of the composite particles is from 46 to 64 wt %; at least 45 wt % of the silicon is surface silicon as determined by thermogravimetric analysis (TGA); no more than 2 wt % of the silicon is coarse bulk silicon as determined by thermogravimetric analysis (TGA); and the hydrogen content of the composite particles is from 0.55 to 0.75 wt %.

The composite particles of the invention are suitably prepared via chemical vapor infiltration (CVI) of a silicon-containing precursor into the pore structure of the porous particle framework. As used herein, CVI refers to processes in which a gaseous silicon-containing precursor is thermally decomposed on a surface to form elemental silicon at the surface and gaseous by-products.

A preferred CVI process comprises the steps of:
(a) providing a plurality of porous particles in a pressure reactor;
(b) continuously introducing a silicon precursor gas into the pressure reactor;
(c) contacting the plurality of porous particles with the silicon precursor gas at conditions effective to cause deposition of silicon in the pores of the porous particles to provide composite particles comprising a porous particle framework and elemental silicon within the pores of the porous particle framework, and
(d) during said contacting, withdrawing an effluent gas from the pressure reactor.

Operating the pressure reactor under these conditions means that the CVI deposition proceeds under conditions where fresh silicon precursor is added before byproducts are removed fully from the system. Thus, as the silicon precursor gas is continuously added to the reactor it mixes with byproducts, resulting in a consistent concentration of silicon precursor. Compared to systems that are operated by batch dosing of silicon precursor gas, the porous particles are contacted by a more consistent concentration of silicon precursor throughout the deposition.

The process is operated as continuous with respect to the silicon precursor gas and batch with respect to the porous particles. Therefore the process operates as a semi-continuous process.

The term continuous is used herein to distinguish from batch-type operation. In a batch operation, a batch of the starting material (porous particles and silicon-containing precursor) is added to the reactor in a first step, the reaction is allowed to progress for a specified period, and then a batch of product (composite particles) is withdrawn from the reactor along with any by-products. In a semi-continuous operation, the introduction of the starting material (silicon precursor) into the reactor, and optionally the withdrawal of the product (effluent gas), occurs continuously with the reaction in progress.

In principle, continuous operation does not exclude the possibility of deviations in the rate of flow of silicon precursor to or effluent gas from the reactor. For instance, a continuous reactor may operate in a pulsed mode. For example, the flow rate of the silicon precursor gas into the pressure reactor may be reduced to aid the withdrawal of effluent gas from the pressure reactor. Alternatively, the silicon precursor gas may be introduced into the pressure reactor at a constant pressure.

Withdrawal of effluent gases may be operated continuously, such that both the supply of the silicon precursor gas and the withdrawal of effluent gas from the reactor occur continuously and simultaneously with the reaction in progress.

Alternatively, withdrawal of the effluent gas from the pressure reactor may be operated semi-continuously. As used herein, semi-continuously means that the effluent gas is removed intermittently.

Semi-continuous withdrawal of the effluent gas from the pressure reactor may be achieved by oscillating the at least one gas outlet of the pressure reactor between an open state and a closed state at a predetermined frequency, such as at least 1 min-1, or 2 min-1.

Suitable gaseous silicon-containing precursors include silane ($SiH_4$), silane derivatives (e.g. disilane, trisilane and tetrasilane), and trichlorosilane ($SiHCl_3$). The silicon-containing precursors may be used either in pure form or as a diluted mixture with a carrier gas, wherein the carrier gas is selected from nitrogen or an inert gas, such as nitrogen or argon.

Preferably, the concentration of the silicon-containing precursor in said diluted mixture in the feedstream to the CVI reaction vessel is at least 60 vol %, or at least 70 vol %, or at least 80 vol %, or at least 90 vol %, or at least 95 vol %, or at least 98 vol %, or at least 99 vol %, based on the total amount of silicon-containing precursor gas and inert carrier gas. Preferably, the concentration of the silicon-containing precursor gas is 100% (i.e. an inert carrier gas is not used).

Preferably, the silicon-containing precursor is free of chlorine. Free of chlorine means that the silicon-containing precursor contains less than 1 wt %, preferably less than 0.1 wt %, preferably less than 0.01 wt % of chlorine-containing compounds.

A suitable temperature for the CVI process is in the range from 350 to 500° C., for example from 350 to 450° C., or 360 to 430° C., or 370 to 420° C., or 370 to 400° C. Preferably, the specified temperature is maintained throughout the CVI process, as temperature fluctuations may cause product inhomogeneities.

The pressure in the pressure reactor during step (c) is preferably in the range from 50 to 15000 kPa, or from 100 to 10000 kPa, or from 150 to 5000 kPa, or from 200 to 2000 kPa, or from 500 to 1800 kPa, or from 800 to 1500 kPa, or from 1000 to 1400 kPa.

Operation at elevated pressure has the advantage that mass transfer limitations on the reaction rate are reduced, facilitating infiltration of the silicon precursor gas into the pore network of the porous particles. Operating at greater pressures also increases the residence time of the silicon precursor gas, thus increasing conversion of the silicon precursor. To prevent uncontrolled reaction, the temperature in the pressure reactor is preferably reduced as the pressure is increased. In particular, where the pressure in the pressure reactor is above 100 kPa, the reaction temperature in the pressure reactor is preferably no more than 450° C., more preferably no more than 430° C., more preferably no more than 420° C., more preferably no more than 410° C., more preferably no more than 400° C., more preferably no more than 395° C.

During step (c), the mole fraction of silicon precursor in the pressure reactor may be in the range from 0.2 to 0.8 by total moles of gaseous compounds in the pressure reactor, or from 0.3 to 0.7, or from 0.4 to 0.6 by total moles of gaseous compounds in the pressure reactor.

The conditions within the CVI reactor should also be as homogenous as possible. Agitation or fluidization of the porous carbon particles ensures that the silicon precursor gas can infiltrate the particles uniformly and also ensures that the temperature in the reactor is homogenous throughout the particle bed. Careful selection of the porous particles together with the use of the controlled CVI conditions described herein therefore allows a particulate material to be obtained with a very high content of surface silicon and a low content of coarse bulk silicon, indicating that a high proportion of the silicon is present in the form of ultrafine silicon nanostructures.

During said contacting, the ratio of flow rate of silicon in the silicon precursor gas in grams per minute to mass of porous particles in the pressure reactor in grams may be in the range from 0.006 to 0.7.

During said contacting, the ratio of flow rate of silicon in the silicon precursor gas in grams per minute to mass of porous particles in the pressure reactor in grams may be in the range from 0.006 to 0.008. These ratios have the advantage that the conversion of silicon precursor is high compared to greater ratios. A high level of conversion of the silicon precursor is thought to help obtain a composite particle with low coarse silicon formation. However, at lower ratios the reaction time is unacceptably long.

Alternatively, during said contacting, the ratio of flow rate of silicon in the silicon precursor gas in grams per minute to mass of porous particles in the pressure reactor in grams may be in the range from 0.01 to 0.7. These ratios have the advantage that an excess of the silicon precursor is maintained in the pressure reactor. In the equilibrium between silicon precursor and silicon+byproduct(s), a high silicon precursor concentration pushes the equilibrium towards the deposition of silicon. As discussed above, at greater pressures in the pressure reactor the rate of deposition of silicon is reduced. Maintaining an excess of silicon precursor in the pressure reactor compensates for the reduced rate of deposition of silicon at greater pressures, thus affording the advantages of operation at greater pressures whilst maintaining the rate of deposition of silicon. This will also help to reduce synthesis time.

During said contacting, the ratio of flow rate of silicon in the silicon precursor gas in grams per minute to (mass of porous particles in the pressure reactor in grams× internal free volume of the reactor in litres) may be in the range from 0.0002 to 0.025. During said contacting, the ratio of flow rate of silicon in the silicon precursor gas in grams per minute to (mass of porous particles in the pressure reactor in grams× internal free volume of the reactor in litres) may be in the range from 0.0002 to 0.0003. Alternatively, during said contacting, the ratio of flow rate of silicon in the silicon precursor gas in grams per minute to (mass of porous particles in the pressure reactor in grams× internal free volume of the reactor in litres) may be in the range from 0.0004 to 0.025. The internal free volume of the reactor refers to that volume free of any internal elements.

The described ratios of flow rate of silicon in the silicon precursor gas to mass of porous particles in the pressure reactor and/or flow rate of silicon in the silicon precursor gas in grams per minute to (mass of porous particles in the pressure reactor in grams× internal free volume of the reactor in litres) may be maintained throughout step (c).

Alternatively, the process may further comprise the step of: adjusting:
(i) the ratio of flow rate of silicon in the silicon precursor gas in grams per minute to mass of porous particles in the pressure reactor in grams, and/or (ii) the ratio of flow rate of silicon in the silicon precursor gas in grams per minute to (mass of porous particles in the pressure reactor in grams× internal free volume of the reactor in litres).

The process may comprise the step of: adjusting after a predetermined period, during said contacting:
(i) the ratio of flow rate of silicon in the silicon precursor gas in grams per minute to mass of porous particles in the pressure reactor in grams, and/or (ii) the ratio of flow rate of silicon in the silicon precursor gas in grams per minute to (mass of porous particles in the pressure reactor in grams× internal free volume of the reactor in litres)

to provide a ratio described above.

The composite particles provided in step (c) may comprise a target amount of silicon that occupies from 20% to 95% of the internal pore volume of the porous particle framework, and the predetermined period may be after the composite particles comprise an amount of silicon that is from 50% to 95% of the target amount, or from 60% to 95%, or from 70% to 95%, or from 80% to 95%, or from 90 to 95% of the target amount. The target amount of silicon may occupy from 20% to 80%, or from 20% to 70%, or from 30% to 70%, or from 30% to 60% of the internal pore volume of the porous particle framework.

The ratios may be adjusted throughout step (c), for example by adjusting the flow rate of silicon precursor gas. For example, step (c) may be operated for a period wherein the ratio of flow rate of silicon in the silicon precursor gas to mass of porous particles in the pressure reactor is outside the range of 0.006 to 0.7. Thereafter, during step (c), the ratio of flow rate of silicon in the silicon precursor gas to mass of porous particles in the pressure reactor may be adjusted to be within the range of 0.006 to 0.7.

Preferably, the pressure reactor is operated such that consumption of the silicon precursor is at least 20%, preferably at least 50%, preferably at least 60%, preferably at least 80%, preferably at least 90%. Alternatively, the pressure reactor may be operated in a low conversion mode wherein consumption of the silicon precursor is no more than 20%, preferably no more than 10%, more preferably no more than 5%.

The composite particles withdrawn from the pressure reactor may comprise from 0.2 to 1.8 grams of silicon per gram of the porous particle framework.

Optionally, step (c) may comprise two or more deposition stages, wherein the supply of the silicon-containing precursor gas is discontinued and wherein by-products are removed from the reactor volume. Removal of by-products may comprise flushing the reactor volume with an inert gas and/or hydrogen gas. More preferably, removal of by-products comprises reducing the pressure in the pressure reactor to less than 50 kPa, or less than 40 kPa, or less than 30 kPa, or less than 20 kPa, or less than 10 kPa, or less than 5 kPa, or less than 3 kPa, or less than 2 kPa, or less than 1 kPa. Supply of the silicon-containing precursor gas is then resumed to continue the silicon deposition. Preferably, the number of deposition stages is no more than 5, more preferably no more than 3.

The surfaces of electroactive materials deposited by CVI are reactive to oxygen and form a native oxide layer when exposed to atmospheric oxygen. The particles formed by CVI may therefore be contacted with a passivating agent prior to exposure of the particles to atmospheric oxygen. A passivating agent is defined herein as a compound that is capable of modifying the surface of the electroactive material in such a way as to inhibit or prevent the formation of surface oxides. Suitable passivating agents and passivation conditions are disclosed in the applicant's WO2022/029422. Optionally, an intermediate passivation step may be carried out between silicon deposition stages, in the case that silicon deposition is discontinued as described above.

The hydrogen content of the composite particles may be adjusted by a thermal treatment (annealing) at a temperature of at least 400° C. and in the presence of an inert gas. Thermal treatment of the composite particles is thought to promote the elimination of hydrogen and the solid-state rearrangement of the silicon atoms, thereby reducing the density of unstable and reactive Si—H bonds and promoting the formation of more thermodynamically stable Si—Si bonds.

The rearrangement of the silicon atoms further contributes to the volumetric contraction of the silicon domains. One result of this is that pore spaces that were previously obstructed or capped by silicon nanostructures are reopened such that passivating gases and other functional gases can access the remaining pore volume. The increased access of passivating gases to the residual pore spaces allows a more extensive passivation of the silicon surfaces, while the elimination of hydrogen from silicon nanostructures in previously inaccessible pore spaces reduces the evolution of hydrogen during charging and discharging.

The inert gas may in principle be any gas that does not undergo reaction during the thermal treatment (annealing) of the composite particles. Preferably, the inert gas is selected from nitrogen and the noble gases, in particular argon. Optionally, the inert gas may comprise hydrogen.

The temperature in the heat treatment step may be at least 450° C., or at least 500° C., or at least 510° C., or at least 520° C., or at least 540° C., or at least 560° C., or at least 580° C., or at least 600° C. Preferably, the temperature in the heat treatment step is no more than 800° C., or no more than 750° C., or no more than 700° C., or no more than 680° C., or no more than 660° C., or no more than 650° C. For example, a suitable heat treatment temperature may be in the range from 510° C. to 800° C., or from 520° C. to 750° C., or from 540° C. to 700° C., or from 560° C. to 680° C., or from 580° C. to 660° C., or from 600° C. to 650° C.

The duration of step (c) is preferably at least 1 minute, or at least 2 minutes, or at least 5 minutes, or at least 10 minutes, or at least 15 minutes, or at least 20 minutes, or at least 30 minutes, or at least 45 minutes, or at least 1 hour, or at least 2 hours. Preferably, the duration of step (c) is no more than 72 hours, or no more than 48 hours, or no more than 24 hours, or no more than 12 hours, or no more than 6 hours, or no more than 5 hours, or no more than 4 hours, or no more than 3 hours.

In a second aspect of the invention, there is provided a composition comprising a particulate material according to the first aspect of the invention and at least one other component. In particular, there is provided a composition comprising a particulate material according to the first aspect of the invention and at least one other component selected from: (i) a binder; (ii) a conductive additive; and (iii) an additional particulate electroactive material. The composition according to the second aspect of the invention is useful as an electrode composition, and thus may be used to form the active layer of an electrode.

The particulate material used to prepare the composition of the second aspect of the invention may have any of the features described as preferred or optional with regard to the first aspect of the invention.

The composition may be a hybrid electrode composition that comprises a particulate material according to the first aspect of the invention and at least one additional particulate electroactive material. Examples of additional particulate electroactive materials include graphite, hard carbon, silicon, tin, germanium, aluminium and lead. The at least one additional particulate electroactive material is preferably selected from graphite and hard carbon, and most preferably the at least one additional particulate electroactive material is graphite.

In the case of a hybrid electrode composition, the composition may comprise at least 5 wt %, or at least 8 wt %, or at least 10 wt %, or at least 12 wt %, or at least 15 wt % of the composite particles according to the second aspect of the invention, based on the total dry weight of the composition. Optionally, the hybrid electrode composition may comprise up to 60 wt % or up to 50 wt % or up to 40 wt % or up to 30 wt % or up to 25 wt % of the composite particles according to the second aspect of the invention, based on the total dry weight of the composition.

Preferably, a hybrid electrode composition comprises from 3 to 60 wt %, or from 3 to 50 wt %, or from 5 to 40 wt %, or from 10 to 30 wt %, or from 15 to 25 wt %, of the particulate material according to the first aspect of the invention, based on the total dry weight of the composition.

The at least one additional particulate electroactive material is suitably present in an amount of from 20 to 95 wt %, or from 25 to 90 wt %, or from 30 to 75 wt % of the at least one additional particulate electroactive material.

The at least one additional particulate electroactive material is preferably selected from carbon-comprising particles, graphite particles and/or hard carbon particles, wherein the graphite and hard carbon particles have a $D_{50}$ particle diameter in the range from to 50 μm. Still more preferably, the at least one additional particulate electroactive material is selected from graphite particles, wherein the graphite particles have a $D_{50}$ particle diameter in the range from 10 to 50 μm.

The composition may also be a non-hybrid (or "high loading") electrode composition that is substantially free of additional particulate electroactive materials. In this context, the term "substantially free of additional particulate electroactive materials" should be interpreted as meaning that the composition comprises less than 15 wt %, preferably less than 10 wt %, preferably less than 5 wt %, preferably less than 2 wt %, more preferably less than 1 wt %, more preferably less than 0.5 wt % of any additional electroactive materials (i.e. additional materials that are capable of inserting and releasing metal ions during the charging and discharging of a battery), based on the total dry weight of the composition.

A "high-loading" electrode composition of this type preferably comprises at least 50 wt %, or at least 60 wt %, or at least 70 wt %, or at least 80 wt %, or at least 90 wt % of the particulate material according to the first aspect of the invention, based on the total dry weight of the composition.

The composition may optionally comprise a binder. A binder functions to adhere the composition to a current collector and to maintain the integrity of the composition. Examples of binders that may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt %, preferably 2 to 10 wt % and most preferably 5 to 10 wt %, based on the total dry weight of the composition.

The binder may optionally be present in combination with one or more additives that modify the properties of the binder, such as cross-linking accelerators, coupling agents and/or adhesive accelerators.

The composition may optionally comprise one or more conductive additives. Preferred conductive additives are non-electroactive materials that are included so as to improve electrical conductivity between the electroactive components of the composition and between the electroactive components of the composition and a current collector. The conductive additives may suitably be selected from carbon black, carbon fibers, carbon nanotubes, graphene, acetylene black, Ketjen Black, metal fibers, metal powders and conductive metal oxides. Preferred conductive additives include carbon black and carbon nanotubes.

The one or more conductive additives may suitably be present in a total amount of from 0.5 to 20 wt %, preferably 1 to 15 wt %, preferably 2 to 10 wt % and most preferably 5 to 10 wt %, based on the total dry weight of the composition.

In a third aspect, the invention provides an electrode comprising a particulate material as defined with reference to the first aspect of the invention. Generally, an electrode comprises the particulate material as an electroactive material and a current collector, wherein the particulate material is in electrical contact with the current collector. The particulate material used to prepare the electrode of the third aspect of the invention may have any of the features described as preferred or optional with regard to the first aspect of the invention.

As used herein, the term current collector refers to any conductive substrate that is capable of carrying a current to and from the electroactive particles in the composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 μm. The particulate materials of the invention may be applied to one or both surfaces of the current collector to a thickness that is preferably in the range from 10 μm to 1 mm, for example from 20 to 500 μm, or from 50 to 200 μm.

Preferably, the electrode comprises a composition as defined with reference to the second aspect of the invention in electrical contact with a current collector. The composition may have any of the features described as preferred or optional with regard to the second aspect of the invention.

The electrode of the third aspect of the invention may suitably be fabricated by combining the particulate material of the invention (optionally in the form of the composition of the invention) with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range from 20 μm to 2 mm, preferably 20 μm to 1 mm, preferably 20 μm to 500 μm, preferably 20 μm to 200 μm, preferably 20 μm to 100 μm, preferably 20 μm to 50 μm.

Alternatively, the slurry may be formed into a freestanding film or mat comprising the particulate material of the invention, for instance by casting the slurry onto a suitable casting template, removing the solvent and then removing the casting template. The resulting film or mat is in the form of a cohesive, freestanding mass that may then be bonded to a current collector by known methods.

The electrode of the third aspect of the invention may be used as the anode of a metal-ion battery. Thus, in a fourth aspect, the present invention provides a rechargeable metal-ion battery comprising the electrode of the third aspect of the invention. In particular, the invention provides a rechargeable metal-ion battery comprising an anode, the anode comprising an electrode as described above, a cathode comprising a cathode active material capable of releasing and reabsorbing metal ions; and an electrolyte between the anode and the cathode.

The metal ions are preferably lithium ions. More preferably the rechargeable metal-ion battery of the invention is a lithium-ion battery, and the cathode active material is capable of releasing and accepting lithium ions.

The cathode active material is preferably a metal oxide-based composite. Examples of suitable cathode active materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the metal-ion battery is preferably provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

EXAMPLES

Example 1

Porous particle frameworks having the properties set out in Table 1 were used to prepare composite particles.

TABLE 1

| Sample | $D_{50}$/μm | $D_{10}$; $D_{90}$/μm | $PV/g \cdot cm^{-3}$ | MPF | $BET/m^2g^{-1}$ |
|---|---|---|---|---|---|
| A | 5.4 | 2.3; 10.4 | 0.73 | 0.70 | 1680 |
| B | 3.3 | 1.2; 7.5 | 0.8 | 0.57 | 1709 |

* PV denotes the total volume of micropores and mesopores as measured by nitrogen gas adsorption; MPF denotes the micropore volume fraction, based on the total volume of micropores and mesopores in the porous particles; BET denotes the BET surface area of the porous particles.

Composite particles were prepared under a variety of CVI reaction conditions to assess the effect of varying composite particle properties on electrochemical performance. Composite particles according to the invention were prepared according to the preferred reaction conditions disclosed above. Comparative composite particles were prepared under modified reaction conditions including one or more of elevated CVI reaction temperature (resulting in reduced surface silicon content, increased coarse silicon content and elevated hydrogen content), reduced particle agitation or static bed (resulting in increased coarse silicon and elevated hydrogen content) and faster air passivation (resulting in higher oxygen content, higher BET and reduced chemical stability of particle surfaces).

Example 2—Electrochemical Testing

Test coin cells were made with negative electrodes comprising the composite particles shown below in Table 2. A dispersion of Carbon Super P (conductive carbon) in CMC binder was mixed in a Thinky™ mixer. The composite particles were added to the mixture and mixed for 30 min. SBR binder was then added to give a CMC:SBR ratio of 1:1, yielding a slurry with a weight ratio of silicon-based material: CMC/SBR: conductive carbon of 70%:16%:14%. The slurry was further mixed for 30 minutes in the Thinky™ mixer, then was coated onto a 10 μm thick copper substrate (current collector) and dried at 50° C. for 10 minutes, followed by further drying at 110° C. for 12 hours to thereby form an electrode comprising an active layer on the copper substrate.

Coin half cells were made using circular electrodes of 0.8 cm radius cut from the electrode with a porous polyethylene separator, a lithium foil as the counter electrode and an electrolyte comprising 1M $LiPF_6$ in a 7:3 solution of EC/FEC (ethylene carbonate/fluoroethylene carbonate) containing 3 wt % vinylene carbonate.

These half cells were used to measure the first lithiation capacity (DC0) and first delithiation capacity (DC1, also referred to as first discharge capacity) and first cycle loss (FCL) of the active layer, wherein DC0 and DC1 are defined in units of mAh per gram of electroactive materials in the electrode and FCL is defined as $(1-(DC1/DC0))\times 100\%$. The half cells were tested by applying a constant current of C/25, (wherein "C" represents the specific capacity of the electrode in mAh, and "25" refers to 25 hours), to lithiate the electrode comprising the porous particles, with a cut off voltage of 10 mV. When the cut off is reached, a constant voltage of 10 mV is applied with a cut off current of C/100. The cell is then rested for 10 minutes in the lithiated state. The electrode is then delithiated at a constant current of C/25 with a cut off voltage of 1V and the cell is then rested for 10 minutes. A constant current of C/25 is then applied to lithiate the cell a second time with a 10 mV cut off voltage, followed by a 10 mV constant voltage with a cut off current of C/100 and rest for 5 minutes.

The effect of the invention can be seen in Table 2. Specifically, it has been found that the first discharge capacity (DC1) is reduced and the first cycle loss (FCL) of the active materials is increased when the composite particles lack one or more of the properties set out in claim 1.

TABLE 2

| Sample | Framework | Si wt % | Coarse Si wt % | Surface Si wt % | O wt % | O/Si wt/wt | H wt % | BET m²/g | H/Si % | DC1 mAh/g | FCL % |
|---|---|---|---|---|---|---|---|---|---|---|---|
| 1* | B | 51.3 | 0.5 | 60 | 4.66 | 0.09 | 0.84 | 46.2** | 1.64 | 1895 | 15.7 |
| 2 | B | 51.26 | 1.68 | 59 | 2.12 | 0.04 | 0.76 | 14.3 | 1.48 | 2077 | 14.5 |
| 3 | B | 51.5 | 0.6 | 54.5 | 3.4 | 0.07 | 0.8 | 20.2 | 1.55 | 1966 | 12.8 |
| 4 | B | 52.2 | 1.35 | 50.4 | 4.12 | 0.08 | 0.96 | 13.7 | 1.84 | 2021 | 14.4 |
| 5 | B | 53.9 | 2.1 | 48 | 4.99 | 0.09 | 1.23 | 10.3 | 2.28 | 2157 | 12 |
| 6 | B | 55 | 3.3 | 47.7 | 2.4 | 0.04 | 0.97 | 11.4 | 1.8 | 2123 | 13 |
| 7* | B | 48.08 | 1.8 | 48 | 3.7 | 0.08 | 1.07 | 60** | 2.23 | 1867 | 16.8 |
| 8* | B | 49.4 | 1.8 | 44 | 4.04 | 0.08 | 1.8** | 9.68 | 3.64 | 1788 | 14.2 |
| 9 | B | 50.7 | 5 | 37 | 5 | 0.10 | 0.8 | 31.4 | 1.57 | 1949 | 13.3 |
| 10 | A | 51.1 | 4 | 35 | 3.1 | 0.06 | 0.79 | 7.8 | 1.55 | 2037 | 12.6 |
| 11 | B | 52.47 | 8.3 | 32 | 1.52 | 0.03 | 0.86 | 7 | 1.64 | 1884 | 16.3 |
| 12* | B | 48.12 | 2.34 | 21.7** | 9.9 | 0.21** | 0.65 | 140 | 1.35 | 1729 | 21.7 |

* denotes a comparative Sample and ** indicates a property outside of the scope of the invention.

The invention claimed is:

1. A particulate material consisting of a plurality of composite particles, wherein the composite particles comprise:
   (a) a porous particle framework comprising micropores and mesopores, wherein the total volume of micropores and mesopores in the porous particle framework as measured by gas adsorption is from 0.5 to 1.8 cm³/g; and
   (b) a plurality of nanoscale elemental silicon domains located within the pores of the porous particle framework, wherein:
   (i) the composite particles comprise from 30 wt % to 70 wt % of silicon;
   (ii) at least 30 wt % of the silicon is surface silicon as determined by thermogravimetric analysis (TGA), wherein the TGA is carried out in air with a temperature ramp rate of 10° C./min, wherein the surface silicon percentage is determined according to the following formula:

$$Y = 1.875 \times [(M_{max} - M_{min})/M_f] \times 100\%$$

wherein Y is the percentage of surface silicon as a proportion of the total silicon in the sample, $M_{max}$ is the maximum mass of the sample measured in the temperature range between 550° C. to 650° C., $M_{min}$ is the minimum mass of the sample above 150° C. and below 500° C., and $M_f$ is the mass of the sample at completion of oxidation at 1400° C.;
   (iii) the hydrogen content of the composite particles is no more than 1.2 wt %;
   (iv) the weight ratio of oxygen to silicon in the composite particles is no more than 0.15; and
   (v) the BET surface area of the composite particles is no more than 40 m²/g.

2. The particulate material according to claim 1, wherein at least 32 wt % of the silicon, or at least 35 wt % of the silicon, or at least 38 wt % of the silicon, or at least 40 wt % of the silicon, or at least 42 wt % of the silicon, or at least 45 wt % of the silicon, or at least 48 wt % of the silicon, or at least 50 wt % of the silicon is surface silicon as determined by thermogravimetric analysis (TGA).

3. The particulate material according to claim 1, wherein no more than 6 wt % of the silicon, or no more than 5 wt %, or no more than 4 wt % of the silicon, or no more than 3.5 wt %, or no more than 3 wt %, or no more than 2.5 wt %, or no more than 2 wt % or no more than 1.5 wt % of the silicon is coarse bulk silicon as determined by thermogravimetric analysis (TGA), wherein the TGA is carried out in air with a temperature ramp rate of 10° C./min, wherein the coarse bulk silicon percentage is determined according to the following formula:

$$Z = 1.875 \times [(M_f - M_{800})/M_f] \times 100\%$$

wherein Z is the percentage of coarse bulk silicon, $M_{800}$ is the mass of the sample at 800° C., and $M_f$ is the mass of ash at completion of oxidation at 1400° C.

4. The particulate material according to claim 1, wherein the total volume of micropores and mesopores in the porous particle framework as measured by gas adsorption is from at least 0.55 cm³/g, or at least 0.6 cm³/g, or at least 0.65 cm³/g, or at least 0.7 cm³/g, or at least 0.75 cm³/g.

5. The particulate material according to claim 1, wherein the total volume of micropores and mesopores in the porous particle framework as measured by gas adsorption is no more than 1.6 cm³/g, or no more than 1.4 cm³/g, or no more than 1.3 cm³/g, or no more than 1.2 cm³/g, or no more than 1.1 cm³/g.

6. The particulate material according to claim 1, wherein the $PD_{90}$ pore diameter of the porous particle framework is no more than 12 nm, or no more than 10 nm, or no more than 8 nm, or no more than 6 nm, or no more than 4 nm, wherein the PD90 pore diameter is the volume-based 90th percentile pore diameter of the porous particle framework, based on the total volume of micropores and mesopores.

7. The particulate material according to claim 1, wherein the $PD_{50}$ pore diameter of the porous particle framework is no more than 2 nm, or no more than 1.9 nm, or no more than 1.8 nm, or no more than 1.7 nm, or no more than 1.6 nm, wherein the $PD_{50}$ pore diameter is the volume-based 50th percentile pore diameter of the porous particle framework, based on the total volume of micropores and mesopores.

8. The particulate material according to claim 1, wherein the $PD_{50}$ pore diameter of the porous particle framework is at least 1 nm, or at least 1.1 nm, or at least 1.2 nm, wherein the $PD_{50}$ pore diameter is the volume-based 50th percentile pore diameter of the porous particle framework, based on the total volume of micropores and mesopores.

9. The particulate material according to claim 1, wherein the micropore volume fraction of the porous particle framework is at least 0.45, or at least 0.5, or at least 0.55, or at least 0.6, or at least 0.65, or at least 0.7, or at least 0.75, based on the total volume of micropores and mesopores.

10. The particulate material according to claim 1, wherein the micropore volume fraction of the porous particle framework is no more than 0.95, or no more than 0.9, or no more than 0.85, or no more than 0.8, based on the total volume of micropores and mesopores.

11. The particulate material according to claim 1, wherein the total volume of micropores in the porous particle framework is at least 0.36 cm³/g, or at least 0.38 cm³/g, at least 0.40 cm³/g, at least 0.42 cm³/g.

12. The particulate material according to claim 1, wherein the porous particle framework has a bimodal or multimodal pore size distribution.

13. The particulate material according to claim 1, wherein the total volume of pores having a diameter in the range of from greater than 50 nm to 100 nm is no more than $0.2 \times P^1$, or no more than $0.1 \times P^1$, or no more than $0.05 \times P^1$, or no more than $0.02 \times P^1$, or no more than $0.01 \times P^1$, or no more than $0.005 \times P^1$, wherein $P^1$ represents the total volume of micropores and mesopores in the porous particle framework.

14. The particulate material according to claim 1, wherein the porous particle framework has a BET surface area from 1200 to 3000 m²/g.

15. The particulate material according to claim 1, wherein the porous particle framework is a conductive porous particle framework.

16. The particulate material according to claim 1, wherein the composite particles comprise at least 32 wt % of silicon, or at least 35 wt % of silicon, or at least 38 wt % of silicon, or at least 40 wt % of silicon, or at least 42 wt % of silicon, or at least 44 wt % of silicon, or at least 46 wt % of silicon, or at least 48 wt % of silicon, or at least 50 wt % of silicon.

17. The particulate material according to claim 1, comprising up to 68 wt % of silicon, or up to 65 wt % of silicon, or up to 60 wt % of silicon, or up to 58 wt % of silicon, or up to 55 wt % of silicon.

18. The particulate material according to claim 1, wherein the composite particles comprise at least 0.1 wt % of hydrogen, or at least 0.15 wt % of hydrogen, or at least 0.2 wt % of hydrogen.

19. The particulate material according to claim 1, wherein the composite particles comprise no more than 1.1 wt % of hydrogen, or no more than 1 wt % of hydrogen, or no more than 0.95 wt % of hydrogen, or no more than 0.9 wt % of hydrogen, or no more than 0.85 wt % of hydrogen, or no more than 0.8 wt % of hydrogen, or no more than 0.75 wt % of hydrogen.

20. The particulate material according to claim 1, wherein the composite particles comprise no more than 6 wt % of oxygen, or no more than 5.5 wt % of oxygen, or no more than 5 wt % of oxygen, or no more than 4.5 wt % of oxygen.

21. The particulate material according to claim 1, wherein the weight ratio of oxygen to silicon in the composite particles is no more than 0.14, or no more than 0.12, or no more than 0.1, or no more than 0.09, or no more than 0.08.

22. The particulate material according to claim 1, wherein the composite particles have a $D_{50}$ particle diameter of at least 1 µm, or at least 2 µm, or at least 3 µm, or at least 4 µm, or at least 5 µm.

23. The particulate material according to claim 1, wherein the composite particles have a $D_{50}$ particle diameter of no more than 20 µm, or no more than 18 µm, or no more than 16 µm, or no more than 14 µm, or no more than 12 µm, or no more than 10 µm, or no more than 8 µm.

24. The particulate material according to claim 1, wherein the composite particles have a $D_{10}$ particle diameter of at least 0.5 µm, or at least 0.8 µm, or at least 1 µm, or at least 1.5 µm, or at least 2 µm.

25. The particulate material according to claim 1, wherein the composite particles have a $D_1$ particle size of at least 0.5 µm, or at least 0.8 µm, or at least 1.0 µm, or at least 1.2 µm, or at least 1.4 µm, or at least 1.5 µm.

26. The particulate material according to claim 1, wherein the composite particles have a $D_{90}$ particle diameter of no more than 30 µm, or no more than 25 µm, or no more than 20 µm, or no more than 15 µm.

27. The particulate material according to claim 1, wherein the composite particles have a BET surface area of no more than 35 m²/g, or no more than 30 m²/g, or no more than 25 m²/g, or no more than 20 m²/g, or no more than 15 m²/g, or no more than 10 m²/g.

28. The particulate material according to claim 1, wherein the composite particles have a BET surface area of at least 0.1 m²/g, or at least 1 m²/g, or at least 2 m²/g, or at least 5 m²/g.

29. The particulate material according to claim 1, wherein the composite particles are obtained by chemical vapor infiltration (CVI) of a silicon-containing precursor into the pore structure of a porous carbon framework.

30. A composition comprising the particulate material of claim 1 and at least one other component.

31. An electrode comprising the particulate material of claim 1.

32. A rechargeable metal-ion battery comprising the electrode of claim 31.

33. The particulate material according to claim 1, wherein the porous particle framework is a conductive porous carbon particle framework comprising at least 80 wt % of carbon.

34. The particulate material according to claim 1, wherein the porous particle framework is a conductive porous carbon particle framework comprising at least 90 wt % of carbon.

* * * * *